US012618961B2

(12) United States Patent
Subburaj et al.

(10) Patent No.: US 12,618,961 B2
(45) Date of Patent: May 5, 2026

(54) PHASE ADJUSTING FMCW RADAR SYSTEM

(71) Applicant: Texas Instruments Incorporated, Dallas, TX (US)

(72) Inventors: Karthik Subburaj, Bangalore (IN); Kameswaran Vengattaramane, Bangalore (IN); Shankar Ram Narayana Moorthy, Bangalore (IN); Vashishth Dudhia, Ahmedabad (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 540 days.

(21) Appl. No.: 17/948,227

(22) Filed: Sep. 20, 2022

(65) Prior Publication Data

US 2023/0305132 A1     Sep. 28, 2023

(30) Foreign Application Priority Data

Mar. 28, 2022     (IN) .............................. 202241018046

(51) Int. Cl.
  *G01S 13/38* (2006.01)
  *G01S 7/35* (2006.01)
  *G01S 7/40* (2006.01)

(52) U.S. Cl.
  CPC .............. *G01S 13/38* (2013.01); *G01S 7/356* (2021.05); *G01S 7/4008* (2013.01)

(58) Field of Classification Search
  CPC combination set(s) only.
  See application file for complete search history.

(56) References Cited

U.S. PATENT DOCUMENTS 11,131,764 B2 *     9/2021    Takayama ............. G01S 13/583
2018/0053998 A1 *   2/2018    Ashida ................... H01Q 1/246
2020/0287587 A1 *   9/2020    Cheung .................... G01S 7/52

* cited by examiner

*Primary Examiner* — Vladimir Magloire
*Assistant Examiner* — Eric K Hodac
(74) *Attorney, Agent, or Firm* — Michael T. Gabrik; Frank D. Cimino

(57) ABSTRACT

In described examples, a frequency modulated continuous wave (FMCW) radar system includes an FMCW signal generator, a number N transmitters, N phase shifters, multiple receivers, and a processor. The FMCW signal generator is configured to generate FMCW chirps. Different ones of the phase shifters have different respective base phase shifts selected in response to N. The transmitter is configured to transmit the phase shifted FMCW chirps. The receivers are configured to receive an FMCW chirp reflected by an object in range of the FMCW radar system. The processor is configured to determine a location of the object in range in response to the received FMCW chirp.

20 Claims, 11 Drawing Sheets

200

210

PHASE ADJUSTING FMCW RADAR SYSTEM

CROSS-REFERENCE TO RELATED APPLICATION

This application claims the benefit of and priority to India Provisional Application No. 202241018046, filed Mar. 28, 2022, which is incorporated herein by reference.

TECHNICAL FIELD

This application relates generally to short-range frequency modulated continuous wave (FMCW) radar for automotive and industrial applications, and more particularly to selecting phase shifts of signals corresponding to different transmitters in an FMCW system.

BACKGROUND

An FMCW radar transmits an electromagnetic radiation (EMR) signal with a known frequency that is modulated to vary up and down over time. The radar receives a reflected signal corresponding to the transmitted signal, and uses the received signal to determine presence, distance, angle of arrival, speed, and direction of movement of objects within a detection distance limit of the FMCW radar. Speed and direction of movement together correspond to a velocity of a detected object.

SUMMARY

In described examples, a frequency modulated continuous wave (FMCW) radar system includes an FMCW signal generator, a number N transmitters, N phase shifters, multiple receivers, and a processor. The FMCW signal generator is configured to generate FMCW chirps. Different ones of the phase shifters have different respective base phase shifts selected in response to N. The transmitter is configured to transmit the phase shifted FMCW chirps. The receivers are configured to receive an FMCW chirp reflected by an object in range of the FMCW radar system. The processor is configured to determine a location of the object in range in response to the received FMCW chirp.

BRIEF DESCRIPTION OF THE DRAWINGS

The same reference numbers or other reference designations are used in the drawings to designate the same or similar (structurally and/or functionally) features.

DETAILED DESCRIPTION

Figure 1:
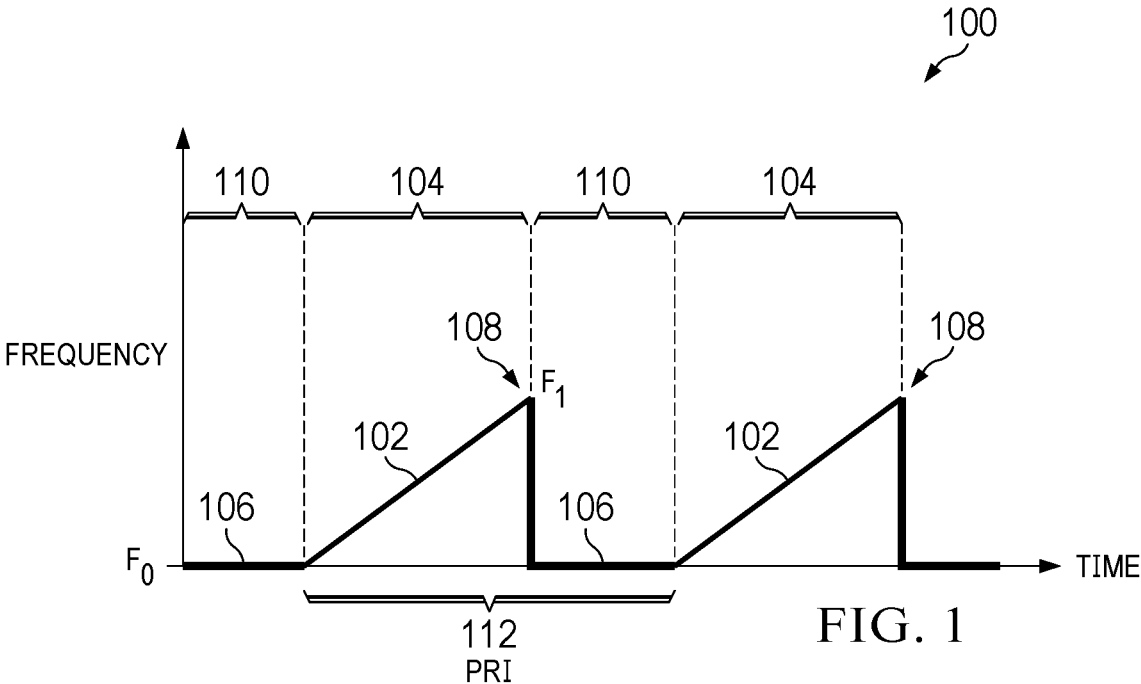
FIG. 1 shows a graph of an example FMCW signal to be transmitted by an automotive or industrial FMCW radar system.

FIG. 1 shows a graph of an example FMCW signal 100 to be transmitted by an automotive or industrial FMCW radar system. The vertical axis corresponds to frequency, and the horizontal axis corresponds to time. The FMCW signal 100 is modulated to define FMCW chirps 102. The duration of an FMCW chirp 102 is referred to herein as the ramp time 104. During an FMCW chirp 102, the transmitter frequency may ramp upwards like a sawtooth wave, from a base frequency $F_0$ 106 to a maximum frequency $F_1$ 108. An FMCW chirp 102 has a slope $S=(F_1-F_0)$/ramp time. The slope of the FMCW signal 100 corresponds to a change in frequency per unit of time, for example, ΔHz/s. Between FMCW chirps 102 are idle times 110. An idle time 110 is a period during which a transmitter transmitting the FMCW signal 100 is turned off.

The time from the beginning of one FMCW chirp 102 to the beginning of the next FMCW chirp 102 is referred to as the pulse repetition interval (PRI) 112 of the FMCW signal 100, and equals the ramp time 104 plus the idle time 110. The inverse of the PRI 112 is the pulse repetition frequency (PRF) of the FMCW signal 100. Fast time refers to the different time slots composing a PRI 112 during a single FMCW chirp 102, and is dependent on the rate at which a received signal is sampled. Slow time updates after each PRI 112, and refers to time over the course of multiple FMCW chirps 102.

Figure 2A:
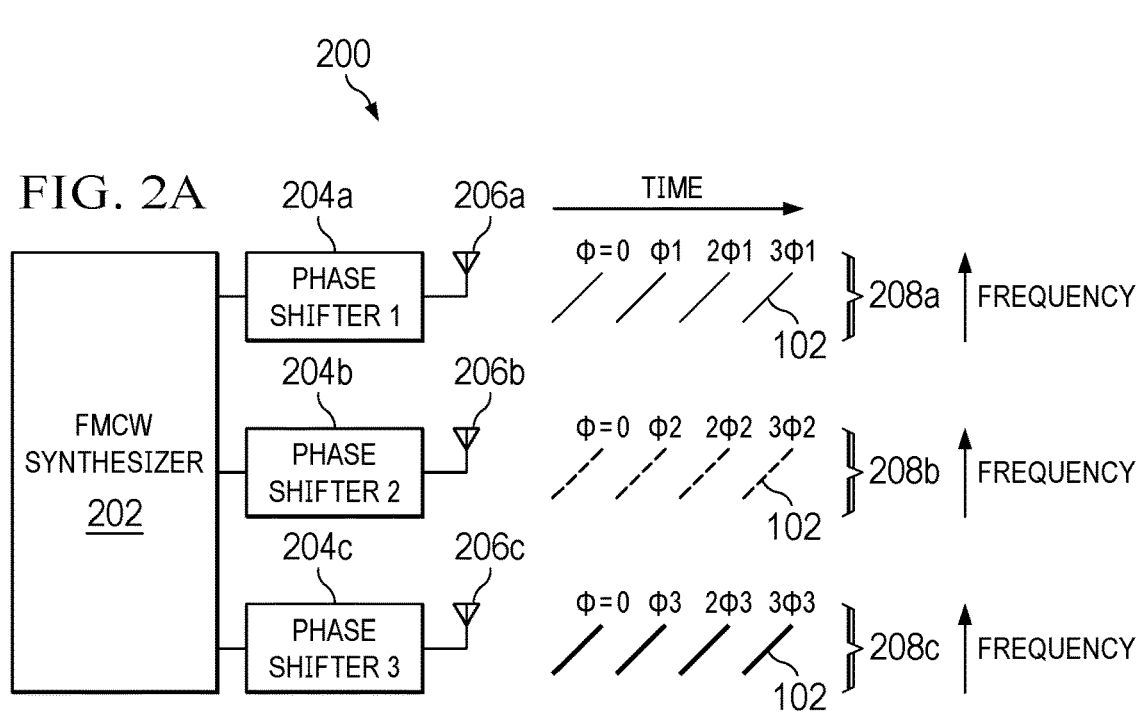
FIG. 2A shows a diagram of an example Doppler division multiple access (DDMA) FMCW transmission.

FIG. 2A shows a diagram of an example Doppler division multiple access (DDMA) FMCW transmission 200. An FMCW synthesizer 202 (see FIG. 3, also referred to as an FMCW signal generator) generates an FMCW signal 100. The FMCW synthesizer 202 outputs the FMCW signal 100 to a first phase shifter (phase shifter 1) 204a, a second phase shifter (phase shifter 2) 204b, and a third phase shifter (phase shifter 3) 204c. The first phase shifter 204a outputs a phase shifted FMCW signal 100 to a first transmitter 206a. The second phase shifter 204b outputs a phase shifted FMCW signal 100 to a second transmitter 206b. The third phase shifter 204c outputs a phase shifted FMCW signal 100 to a third transmitter 206c.

Example FMCW chirps 102 are shown corresponding to each of the first transmitter 206a, the second transmitter 206b, and the third transmitter 206c. The FMCW synthesizer 202 and the first phase shifter 204a together generate a first set of chirps 208a. The FMCW synthesizer 202 and the second phase shifter 204b together generate a second set of chirps 208b. The FMCW synthesizer 202 and the third phase shifter 204c together generate a third set of chirps 208c.

To perform DDMA FMCW transmission, an FMCW signal, such as the FMCW signal 100 of FIG. 1, is phase shifted using phase shift coding that is differentiated in slow time (e.g., between sets of chirps) for different transmitters. In an example, a phase shift coding has sixty-four possible code settings, from zero to sixty-three, representing zero radians to $2\pi*63/64^{ths}$ radians. Example phase shift code vectors include [0 16 32 48 0 16 32 48 0] and [0 24 48 8 32 56 16 40 0]. The first phase shift code vector increments by 16, and the second coding vector increments by 24. After eight FMCW chirps 102, the two phase shift code vectors return to the same zero value phase offset, so that they periodically have the same value in fast time. However, the two vectors are differentiated over slow time.

To differentiate the first, second, and third sets of FMCW chirps 208a, 208b, and 208c, each of the first, second, and third phase shifters 204a, 204b, and 204c has a corresponding base phase shift. The base phase shift, for a given phase shifter, is the phase difference between successive chirps in a set of chirps transmitted by the shifter. The base phase shift for the first phase shifter 204a is φ1. The base phase shift for the second phase shifter 204b is φ2. The base phase shift for the third phase shifter 204c is φ3. The first, second, and third phase shifters 204a, 204b, and 204c phase shift the FMCW signal 100 received from the FMCW synthesizer 202 by a sequentially increasing integer multiple (starting with zero) of the corresponding base phase shift for each successive FMCW chirp 102 transmitted by the respective first, second, or third phase shifter 204a, 204b, or 204c. Accordingly, the first transmitter 206a transmits the FMCW signal 100 with a set of phase shifts that can be expressed, in slow time, as a first phase shift vector [0 1φ1 2φ1 3φ1 . . . ]. Similarly, the second transmitter 206b transmits the FMCW signal 100 with a set of phase shifts expressible in slow time as a second phase shift vector [0 1φ2 2φ2 3φ2 . . . ], and the third transmitter 206c transmits the FMCW signal 100 with a set of phase shifts that can be expressed, in slow time, as a third phase shift vector [0 1φ3 2φ3 3φ3 . . . ]. A base phase shift vector refers to a vector containing base phase shifts for respective ones of the first, second, and third phase shifters 204a, 204b, and 204c. In the above example, in which the first phase shifter 204a has a base phase shift of 41, the second phase shifter 204b has a base phase shift of φ2, and the third phase shifter 204c has a base phase shift of φ3, the base phase shift vector is [φ1 φ2 φ3].

A DDMA FMCW radar system can be used to implement a multiple-input multiple-output (MIMO) radar system. In a MIMO radar system with a number N transmitters and a number M receivers, if the N signals transmitted by the transmitters are predictable and different across different transmitters, yielding unique Doppler shift per transmitter, then N different signals can be extracted from each of the signals received by the M receivers, resulting in N×M different received signals, as if the MIMO radar system had N×M different receivers. This enables improved spatial resolution of the radar system. Doppler differentiation can be used to make the N transmitted signals predictable and unique using phase shift vectors that are differentiated from each other in slow time.

Figure 2B:
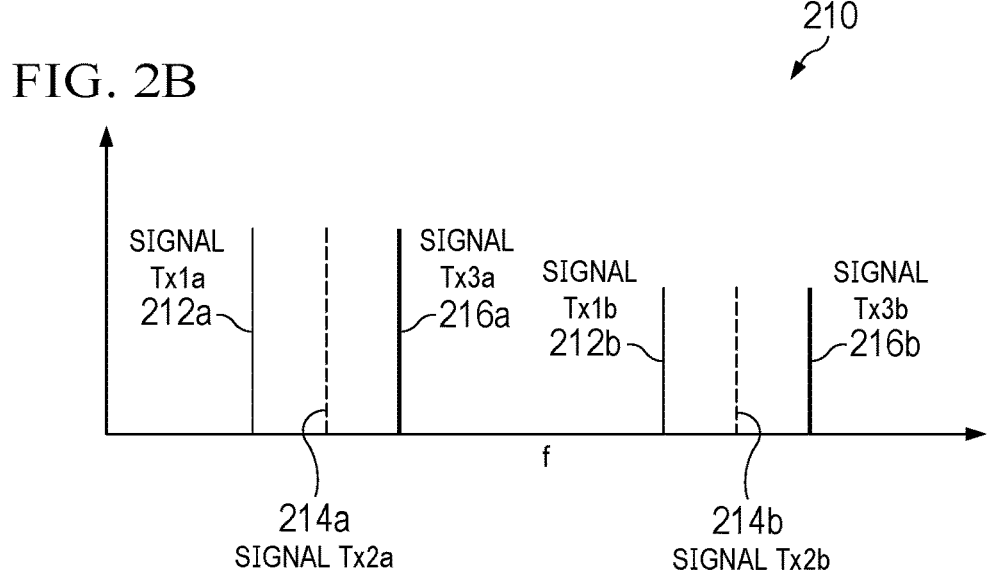
FIG. 2B shows a graph of an example received reflected FMCW signal corresponding to the DDMA FMCW transmission of FIG. 2A.

FIG. 2B shows a graph of example Doppler shifts of received reflected FMCW chirps 210 corresponding to the DDMA FMCW transmission 200 of FIG. 2A. A horizontal axis corresponds to Doppler shift frequency and a vertical axis corresponds to amplitude. In an example, the base phase shift of the first, second, and third phase shifters 206a, 206b, and 206c are, respectively, φ1=0, φ2=v, and φ3=2v. Doppler shift refers to a change in frequency of a signal received by an FMCW radar system (such as the FMCW radar system 300 of FIG. 3) with respect to a corresponding FMCW chirp 102 transmitted by the FMCW radar system. Doppler shifts are caused by relative motion of the FMCW radar system with respect to an object off which the received signal was reflected. FMCW chirps 102 that are transmitted at the same time as phase shifted copies of each other—same base frequency $F_0$ 106, same ramp time 104, and same maximum frequency $F_1$ 108—result in different Doppler shifts. In some examples, if the base phase shift is zero, then the Doppler frequency in a received reflected signal is dependent only on the velocity of the reflecting object. DDMA phase shifting results in Doppler frequencies that are unique per transmitter and that add to the inherent Doppler frequency shift that is dependent solely on velocity.

A Doppler shift of a first received signal (signal Tx1a) 212a corresponds to an FMCW chirp 102 of the first set of chirps 208a, transmitted by the first transmitter 206a. A Doppler shift of a second received signal (signal Tx2a) 214a corresponds to an FMCW chirp 102 of the second set of chirps 208b, transmitted by the second transmitter 208b. A Doppler shift of a third received signal (signal Tx3a) 216a corresponds to the third set of chirps 208c, transmitted by the third transmitter 208c. Signal Tx1a 212a, signal Tx2a 214a, and signal Tx3a 216a are shown grouped together, separated in frequency by relatively small increments corresponding to the separations in phase of the first set of chirps 208a, the second set of chirps 208b, and the third set of chirps 208c. Accordingly, signal Tx1a 212a, signal Tx2a 214a, and signal Tx3a 216a correspond to a first detected object.

Similarly, a Doppler shift of a fourth received signal (signal Tx1b) 212b corresponds to an FMCW chirp 102 of the first set of chirps 208a, transmitted by the first transmitter 206a. A Doppler shift of a fifth received signal (signal Tx2b) 214b corresponds to an FMCW chirp 102 of the second set of chirps 208b, transmitted by the second transmitter 208b. A Doppler shift of a sixth received signal (signal Tx3c) 216c corresponds to the third set of chirps 208c, transmitted by the third transmitter 208c. Signal Tx1b 212b, signal Tx2b 214b, and signal Tx3b 216b are shown grouped together, separated in frequency by relatively small increments corresponding to the separations in phase of the first set of chirps 208a, the second set of chirps 208b, and the third set of chirps 208c. Accordingly, signal Tx1b 212b, signal Tx2b 214b, and signal Tx3b 216b correspond to a second detected object.

Figure 3:
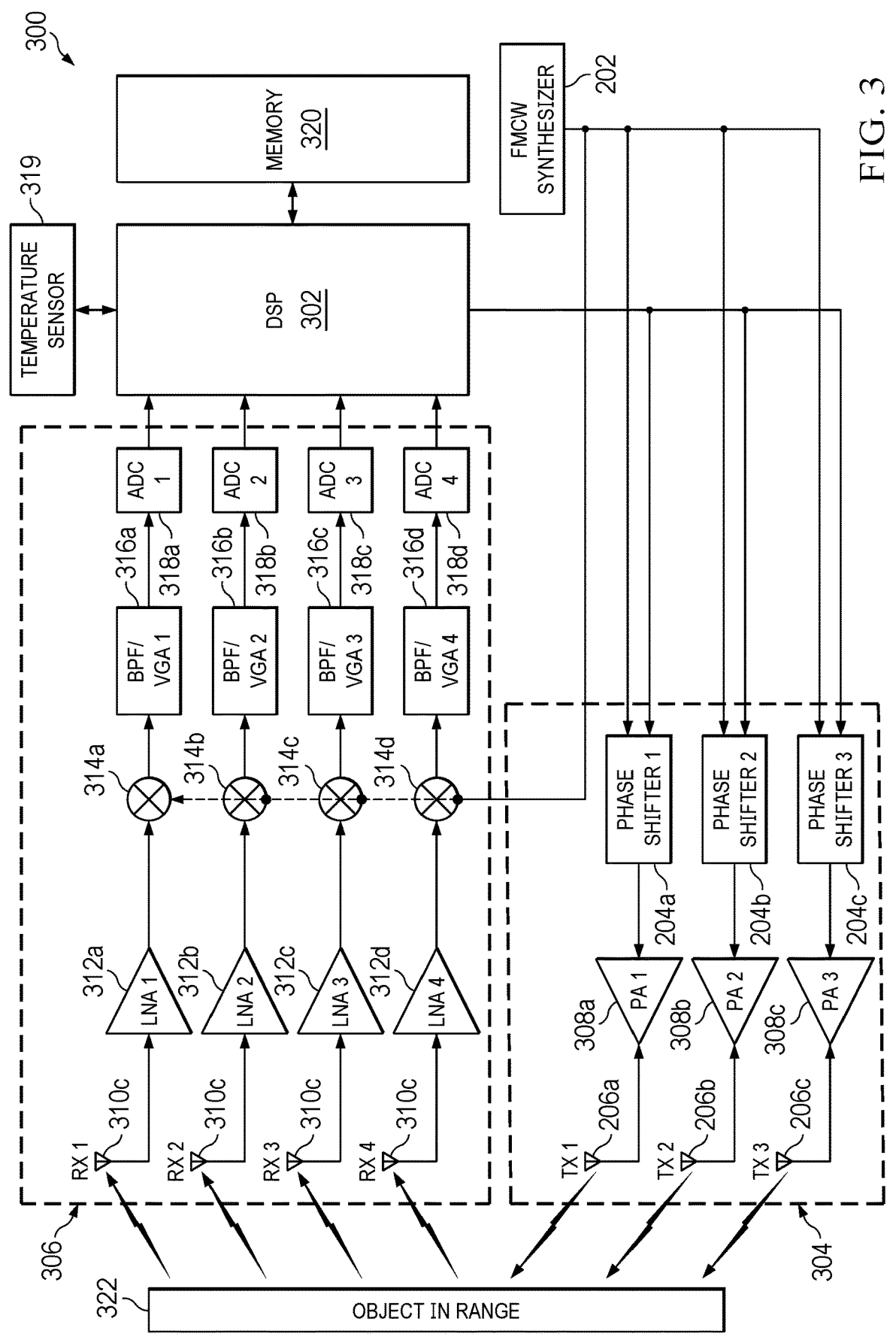
FIG. 3 shows a functional block diagram of an example FMCW radar system for transmitting a DDMA FMCW transmission as shown in FIG. 2A, and receiving reflected FMCW chirps as shown in FIG. 2B.

FIG. 3 shows a functional block diagram of an example FMCW radar system 300 for transmitting a DDMA FMCW transmission 200 as shown in FIG. 2A, and receiving reflected FMCW chirps 210 as shown in FIG. 2B. The FMCW radar system 300 includes an FMCW synthesizer 202, a digital signal processor (DSP) 302, a transmitter side 304, a receiver side 306, a temperature sensor 319, and a memory 320. The transmitter side 304 of the FMCW radar system 300 includes a first phase shifter (phase shifter 1) 204a, a second phase shifter (phase shifter 2) 204b, and a third phase shifter (phase shifter 3) 204c; a first power amplifier (PA1) 308a, a second power amplifier (PA2) 308b, and a third power amplifier (PA3) 308c; and a first transmitter (TX1) 206a, a second transmitter (TX2) 206b, and a third transmitter (TX3) 206c. The receiver side 306 of the FMCW radar system 300 includes a first receiver (RX1) 310a, a second receiver (RX2) 310b, a third receiver (RX3) 310c, and a fourth receiver (RX4) 310d; a first low noise amplifier (LNA1) 312a, a second low noise amplifier (LNA2) 312b, a third low noise amplifier (LNA3) 312c, and a fourth low noise amplifier (LNA4) 312d; a first mixer 314a, a second mixer 314b, a third mixer 314c, and a fourth mixer 314d; a first band pass filter (BPF) and variable gain amplifier (VGA) block (BPF/VGA 1) 316a, a second BPF and VGA block (BPF/VGA 2) 316b, a third BPF and VGA block (BPF/VGA 3) 316c, and a fourth BPF and VGA block (BPF/VGA 4) 316d; a first analog-to-digital converter (ADC) block (ADC 1) 318a, a second ADC block (ADC 2) 318b, a third ADC block (ADC 3) 318c, and a fourth ADC block (ADC 4) 318d.

The FMCW synthesizer 202 generates FMCW chirps 102 to be transmitted, such as for object detection and range, angle, and velocity determination. The FMCW synthesizer 202 outputs the FMCW chirps 102 to respective first inputs of the first, second, and third phase shifters 204a, 204b, and 204c, and also to respective first inputs of the first, second, third, and fourth mixers 314a, 314b, 314c, and 314d. The first, second, and third phase shifters 204a, 204b, and 204c phase shift the FMCW chirps 102 using respective phase shift code vectors, as described with respect to FIG. 2A. However, actual phase shifter output may vary from ideal phase shifter output due to error introduced or propagated by the phase shifter. Integral nonlinearity (INL) error is the difference between an ideal phase shift in a signal output by a phase shifter, and an actual phase shift in the signal output by the phase shifter. A phase shifter can have different INL errors for different phase shift codes. Further, the first phase shifter 204a, the second phase shifter 204b, and the third phase shifter 204c can respectively have different first, second, and third INL errors corresponding to a particular phase shift code. In some examples, phase shifter INL error varies with temperature. Phase shifter INL error is further described below with respect to FIG. 8, which graphs phase shifter INL error in degrees against phase shift code at different temperatures.

The first, second, and third phase shifters 204a, 204b, and 204c output the FMCW chirps 102 to, respectively, the first, second, and third power amplifiers PA1 308a, PA2 308b, and PA3 308c. The first, second, and third power amplifiers PA1 308a, PA2 308b, and PA3 308c amplify the respective phase shifted FMCW chirp signals, and output the amplified signals to, respectively, the first, second, and third transmitters 206a, 206b, and 206c. The first, second, and third transmitters 206a, 206b, and 206c transmit the amplified, phase shifted FMCW chirps. In some examples, the transmitted signals are reflected by an object 322 that is within the detection and range, angle, and velocity determination range of the FMCW radar system 300 (object in range 322).

The reflected signals are received by the first, second, third, and fourth receivers 310a, 310b, 310c, and 310d. The first, second, third, and fourth receivers 310a, 310b, 310c, and 310d output the received signals to, respectively, the first, second, third, and fourth low noise amplifiers LNA1 312a, LNA2 312b, LNA3 312c, and LNA4 312d, which amplify the received signals. The first, second, third, and fourth low noise amplifiers LNA1 312a, LNA1 312b, LNA1 312c, and LNA4 312d output the amplified signals to second inputs of, respectively, the first, second, third, and fourth mixers 314a, 314b, 314c, and 314d. The first, second, third, and fourth mixers 314a, 314b, 314c, and 314d output the mixed signals to, respectively, the first, second, third, and fourth BPF/VGA blocks 316a, 316b, 316c, and 316d, which filter and amplify the mixed signals. The first, second, third, and fourth BPF/VGA blocks 316a, 316b, 316c, and 316d output the resulting cleaned signals to, respectively, the first, second, third, and fourth ADC blocks 318a, 318b, 318c, and 318d, which sample the cleaned mixed signals to generate respective data sets made up of digital samples. The first, second, third, and fourth ADC blocks 318a, 318b, 318c, and 318d output the digital samples to the DSP 302 for analysis.

The DSP 302 uses the digital samples to determine presence, range, angle, and velocity of the object in range 322. For example, presence of an object may be determined based on a signal amplitude greater than a threshold. Range may be determined by a unique range frequency corresponding to the signal's round trip delay multiplied by the FMCW chirp 102 slope. Velocity may be determined by the phase variation of the unique range frequency over multiple chirps, which manifests as a unique Doppler frequency. Angle may be determined by the phase variation for a particular received chirp across different receivers, caused by the difference in time of flight across the different receivers. These determinations are further discussed with respect to FIGS. 4 and 5.

Phase shifter INL errors can cause false Doppler shift peaks (also caused spurs) in DSP 302 analysis results, potentially adversely affecting accuracy of angle and velocity determinations. For example, Doppler shift spurs may be interpreted as ghost targets—detected objects that are not actually present. Doppler shift spurs can be mitigated by using selected base phase shift values to construct phase shift code vectors respectively used by the first, second, and third phase shifters 204a, 204b, and 204c, as further discussed with respect to FIG. 6. Further, false Doppler shift peaks corresponding to one transmitter (such as the first, second, or third transmitter 206a, 206b, or 206c) can overlap with true Doppler shift peaks corresponding to another transmitter, distorting results. This is referred to as inter-transmitter coupling. Inter-transmitter coupling can be mitigated by determining and applying a code offset to the phase shift code vectors to reduce effects of INL error on received signals, as further discussed with respect to FIG. 7. The temperature sensor 319 measures ambient temperature and provides temperature information to the DSP 302, enabling the DSP 302 to update code offsets in dependence on temperature-dependent code offset information stored in the memory 320.

Figure 4:
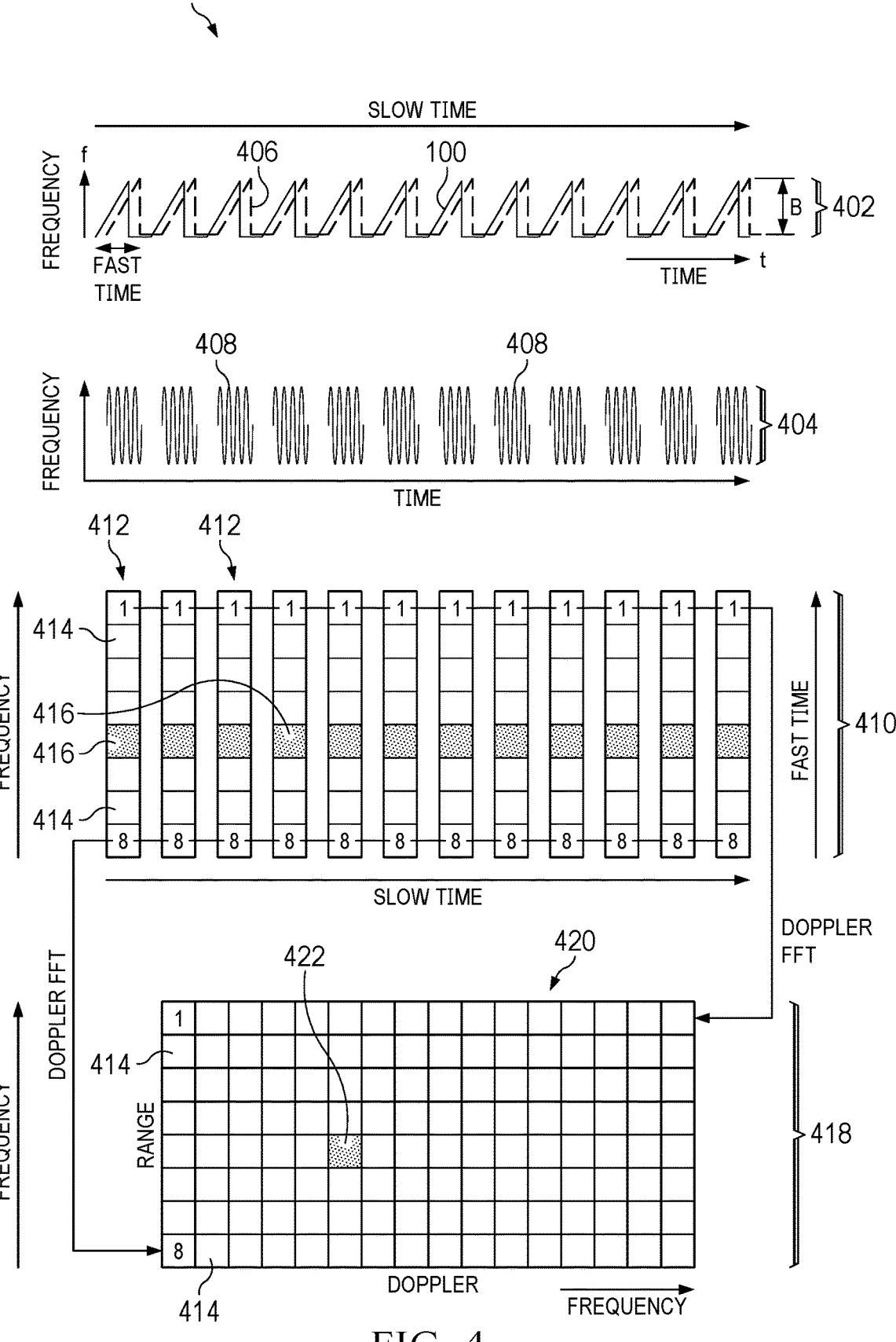
FIG. 4 illustrates a process for determining range and velocity using FMCW chirps transmitted and received by the FMCW radar system of FIG. 3.

FIG. 4 illustrates a process 400 for determining range and velocity using FMCW chirps 102 transmitted and received by the FMCW radar system 300 of FIG. 3. For steps 402 and 404, the horizontal axis indicates time, and the vertical axis indicates frequency. The frequency range of the FMCW chirps 102 corresponds to the intermediate frequency (IF) bandwidth of the FMCW radar system 300, "B". The IF signal is the product of mixing the received signal with the transmitted signal; the IF bandwidth is the bandwidth of the IF signal. In step 402, an FMCW signal 100 is transmitted, and a received FMCW signal 406 is received. Individual FMCW chirps 102 are transmitted and received in fast time. The FMCW signal 100 is transmitted, and the received FMCW signal 406 is received, in slow time. The amount of time for a transmitted signal to reach the object in range 322 equals d. The time for the reflected signal to return from the object in range 322 and be received by the first, second, third, and fourth receivers 310a, 310b, 310c, and 310d also equals d. Accordingly, the time of flight of an FMCW chirp 102 reflected by the object in range 322 is 2d. Further, as discussed with respect to FIG. 2B, received FMCW chirps 102 are Doppler shifted relative to corresponding transmitted FMCW chirps 102 depending on motion of the FMCW radar system 300 relative to the object in range 322 from which the received FMCW chirps 102 are reflected, and depending on phase shift applied by a corresponding one of the first, second, or third phase shifter 204a, 204b, or 204c.

In step 404, the first, second, third, and fourth mixers 314a, 314b, 314c, and 314d mix (for example, multiply) respective received signals with the FMCW signal 100 generated by the FMCW synthesizer 202 to produce intermediate frequency (IF) signals 408. The frequency of the IF signal is linearly proportional to the time of flight, 2d, of corresponding FMCW chirp 102. As described with respect to FIG. 3, the first, second, third, and fourth ADCs 318a, 318b, 318c, and 318d sample these IF signals after they are cleaned and amplified, and provide the resulting digital samples to the DSP 302 for analysis. In step 410, the DSP 302 performs a fast Fourier transform (FFT) on sets of the digital samples in fast time, meaning that FFTs are determined for sets of samples of IF signals (received signals mixed with transmitted signals), so that the sets of samples are aligned to respective PRIs 112. This produces a series of one dimensional FFTs 412 that are sequential in time.

The FFTs 412 are divided into frequency bins 414, each frequency bin 414 covering a separate Doppler shift frequency range and having an index represent a range to the object and a value indicating a return signal strength associated with the respective range. The number of frequency bins 414 in respective FFTs 412 corresponds to a frequency resolution—and accordingly, a range and velocity resolution—of the FMCW radar system 300. In the illustrated example, there are eight frequency bins 414 in each FFT 412. In some examples, an FFT 412 includes hundreds of frequency bins. If an object in range 322 is present, over a period of time, to reflect the transmitted FMCW chirps 102, there will be an amplitude spike 416 in frequency bins 414 of the FFTs 412 corresponding to the distance of the object in range 332 from the receiver (the first, second, third, or fourth receiver 310a, 310b, 310c, or 310d) that received the FMCW signal 100 being analyzed. The amplitude spike 416 is shown in FIG. 4 as a shaded box. The FFTs 412 with this amplitude spike 416 correspond to the intermediate frequency indicating the presence of the object in range 322.

In step 418, the DSP 302 performs an FFT on the one dimensional FFTs, in slow time. Accordingly, the DSP 302 performs a two dimensional FFT on a temporally sequential set of the one dimensional FFTs 412 to produce a two dimensional FFT 420 with a set of bins each having an index that represents a combination of range and velocity and a value indicating a return signal strength associated with the respective range and velocity. The two dimensional FFT covers a number of PRIs 112 determined in response to a designed velocity resolution. A vertical dimension of the two dimensional FFT 420, corresponding to fast time (an individual PRI 112), is divided into frequency bins 414 indicating range. A horizontal dimension of the two dimensional FFT 420, corresponding to slow time (across the selected number of PRIs 112), is divided into frequency bins 414 indicating Doppler shift. The horizontal dimension of the two dimensional FFT 420 is also referred to as the Doppler domain of the two dimensional FFT 420. In some examples, the selected number of PRIs 112 covers a few tens of milliseconds.

An amplitude spike 422 (darkened box) in the two dimensional FFT 420 indicates the presence of an object in range 322. A vertical coordinate of the particular frequency bin 414 in which the amplitude spike 422 is located indicates the range of the object in range 322 from the FMCW radar system 300. A horizontal coordinate of the particular frequency bin 414 in which the amplitude spike 422 is located provides Doppler shift information. The Doppler shift information of an amplitude spike 422 in a two dimensional FFT 420 can be used to determine the speed of the object in range 322 relative to the FMCW radar system 300 (for example, the average speed over the selected number of PRIs 112 used to generate the two dimensional FFT 420).

Figure 5:
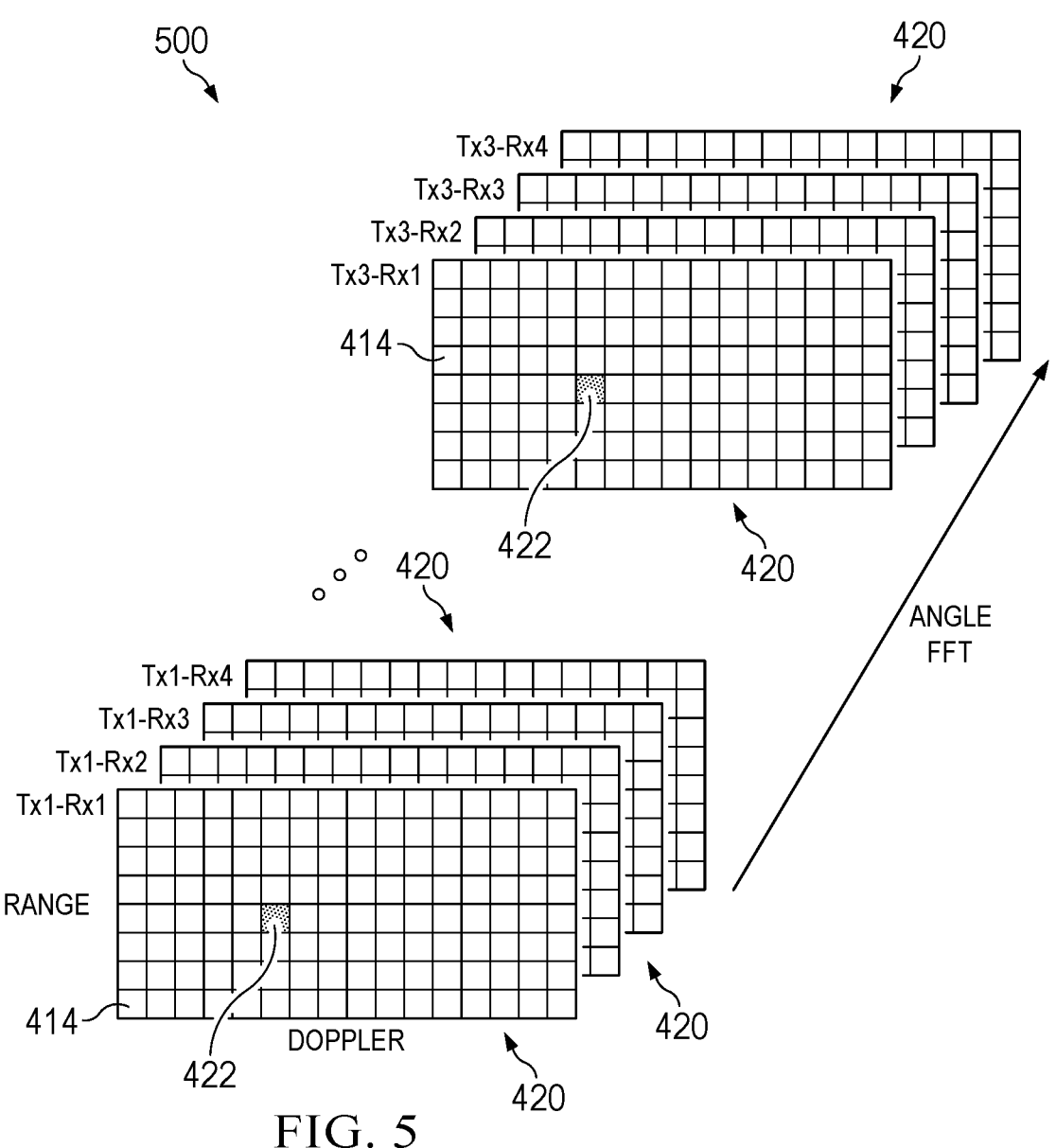
FIG. 5 illustrates a set of two dimensional fast Fourier transforms (FFTs) generated by applying the process of FIG. 4 to DDMA FMCW signals received by the first, second, third, and fourth receivers of FIG. 3.

FIG. 5 illustrates a set 500 of two dimensional FFTs 420 generated by applying the process 400 of FIG. 4 to DDMA FMCW signals received by the first, second, third, and fourth receivers 310a, 310b, 310c, and 310d of FIG. 3. As described above, using differentiated phase shift vectors applied to the first, second, and third phase shifters 204a, 204b, and 204c in slow time enables FMCW signals 100 transmitted by a number N transmitters, and received by a number M receivers, to be treated as N×M separate received signals. For each of the M receivers, an object in range 322 will appear as N different peaks in the one dimensional FFTs 412. This increases the spatial resolution of the FMCW radar system 300. The FMCW radar system 300 has three transmitters and four receivers. Accordingly, applying the process 400 to the FMCW radar system 300 results in twelve received signals, which can also be viewed as twelve objects to be resolved. A disambiguation step, also referred to as transmitter decoding, is performed to distinguish the twelve objects, and then the corresponding one dimensional FFTs 412 are processed to generate twelve two dimensional FFTs 420. Different ones of the distinguished objects correspond to different combinations of the first, second, or third transmitter 206a, 206b, or 206c, and the first, second, third, or fourth receiver 310a, 310b, 310c, or 310d, so that different ones of the two dimensional FFTs 420 correspond to different transmitter-receiver combinations. The two dimensional FFTs 420 are identified according to the transmitter and the receiver to which they correspond. For example, a two dimensional FFT 420 corresponding to the first transmitter (TX1) 206a and the third receiver (RX3) 310c is identified as TX1-RX3, and a two dimensional FFT 420 corresponding to the third transmitter (TX3) 206c and the second receiver (RX2) 310b is identified as TX3-RX2.

As described above, by using two dimensional FFTs 420 corresponding to multiple different receivers, an angle of the object in range 322 with respect to an orientation of the FMCW radar system 300 (angle of arrival) can be determined. For example, two receivers can be used to determine an angle in a single plane, which can be combined with a range to generate a two dimensional location of the object in range 322. For example, two receivers can be used to determine range and azimuth of the object in range 322. Similarly, three receivers can be used to determine angles in multiple planes, which can be combined with the range to determine a three dimensional location of the object in range 322. For example, three receivers can be used to determine range, azimuth, and elevation of the object in range 322.

In an ideal FMCW radar system with N transmitters and without phase shifter (and other) non-linearity, a single object in range 322 will be indicated in a two dimensional FFT 420 by N amplitude spikes 422 in different Doppler shift bins. These N amplitude spikes 422 include one amplitude spike 422 correctly indicating the Doppler shift of the object in range 322, and N minus one sister peaks. The sister peaks are spurious amplitude spikes 422 at offsets that are known or that can be determined from known characteristics of the FMCW radar system 300. Accordingly, the sister peaks can be removed by the DSP 302 in post-processing. This process, referred to as demodulation, is performed after distinguishing the N×M spatial signals corresponding to the N transmitters and M receivers and generating the N×M two dimensional FFTs. Demodulation also facilitates removal of additional spurious amplitude spikes 422. However, phase shifter INL can introduce additional spurious amplitude spikes 422 that make it difficult to discriminate and remove the sister peaks from the true doppler peak (for example, using pattern matching) in post-processing.

Figure 6A:
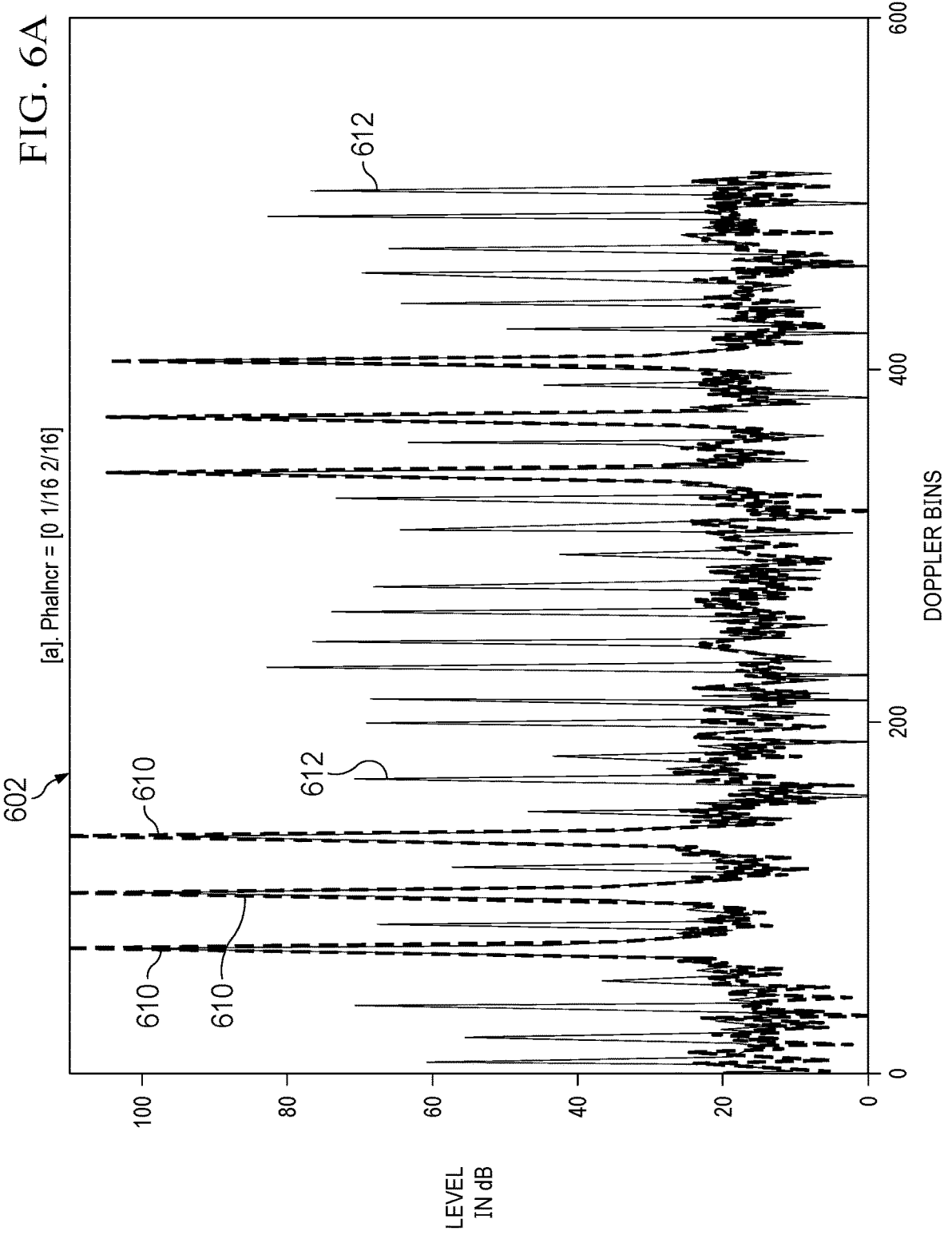
FIGS. 6A, 6B, 6C, and 6D show graphs of Doppler shift versus amplitude of FFTs of example received FMCW signals, received using the FMCW radar system of FIG. 3.

FIG. 6A shows a first graph 602 of Doppler shift versus amplitude of FFTs of first example received FMCW signals 100, received using the FMCW radar system 300 of FIG. 3. The first graph 602 corresponds to an FMCW signal 100 transmitted after being phase shifted using a base phase shift vector of [0 1/16 2/16] (see discussion with respect to FIG. 2A). Herein, base phase shift vectors without described units, such as radians or degrees, are normalized so that a range from zero to one corresponds to a complete circle—equivalent to a radians or 360 degrees. For example, the base phase shift vector used to generate the first graph 602 is shown in radians in Equation 1:

$$2\pi \times \begin{bmatrix} 0 & \dfrac{1}{16} & \dfrac{2}{16} \end{bmatrix} = \begin{bmatrix} 0 & \dfrac{2\pi}{16} & \dfrac{4\pi}{16} \end{bmatrix} \qquad \text{Equation 1}$$

Figure 6B:
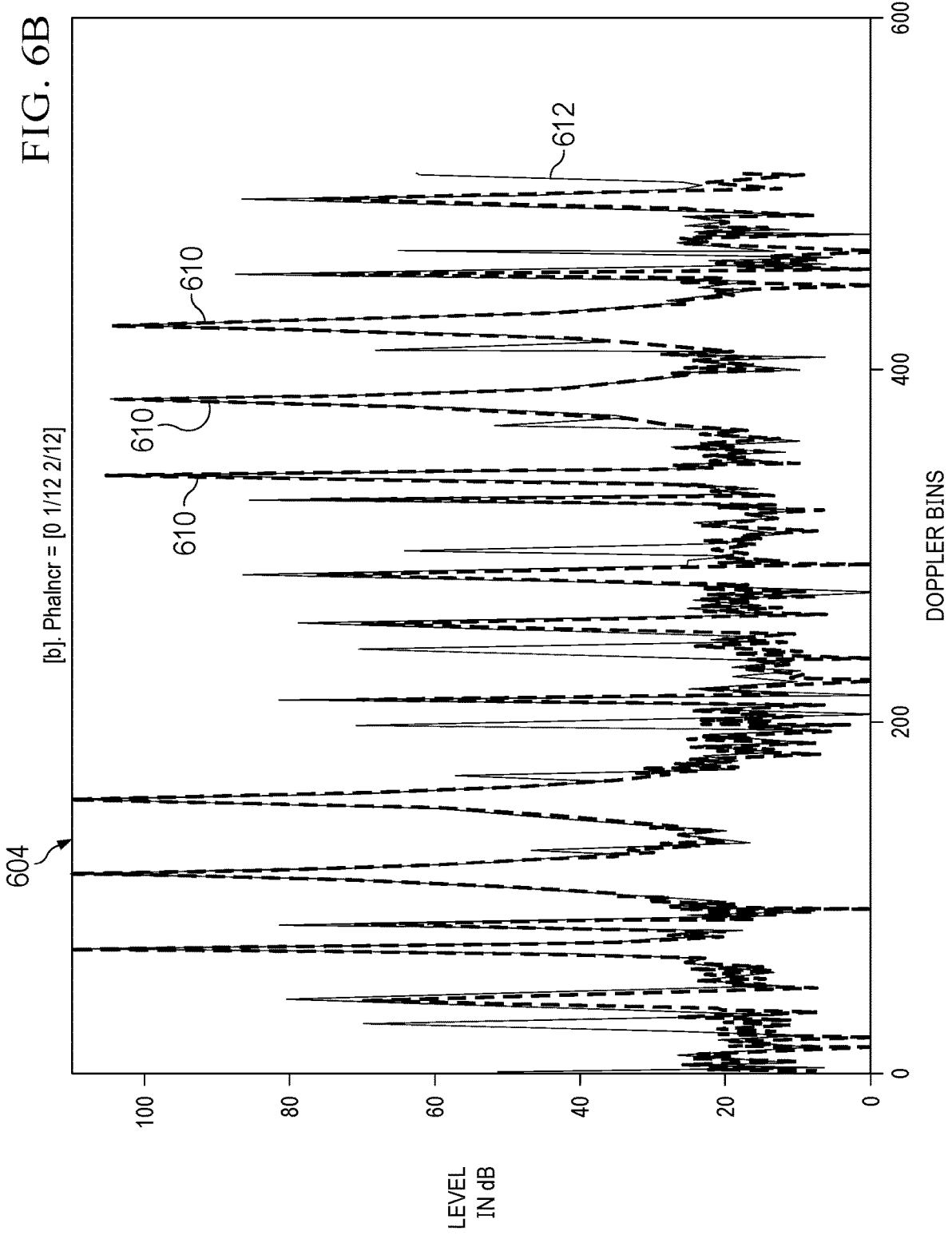
Figure 6C:
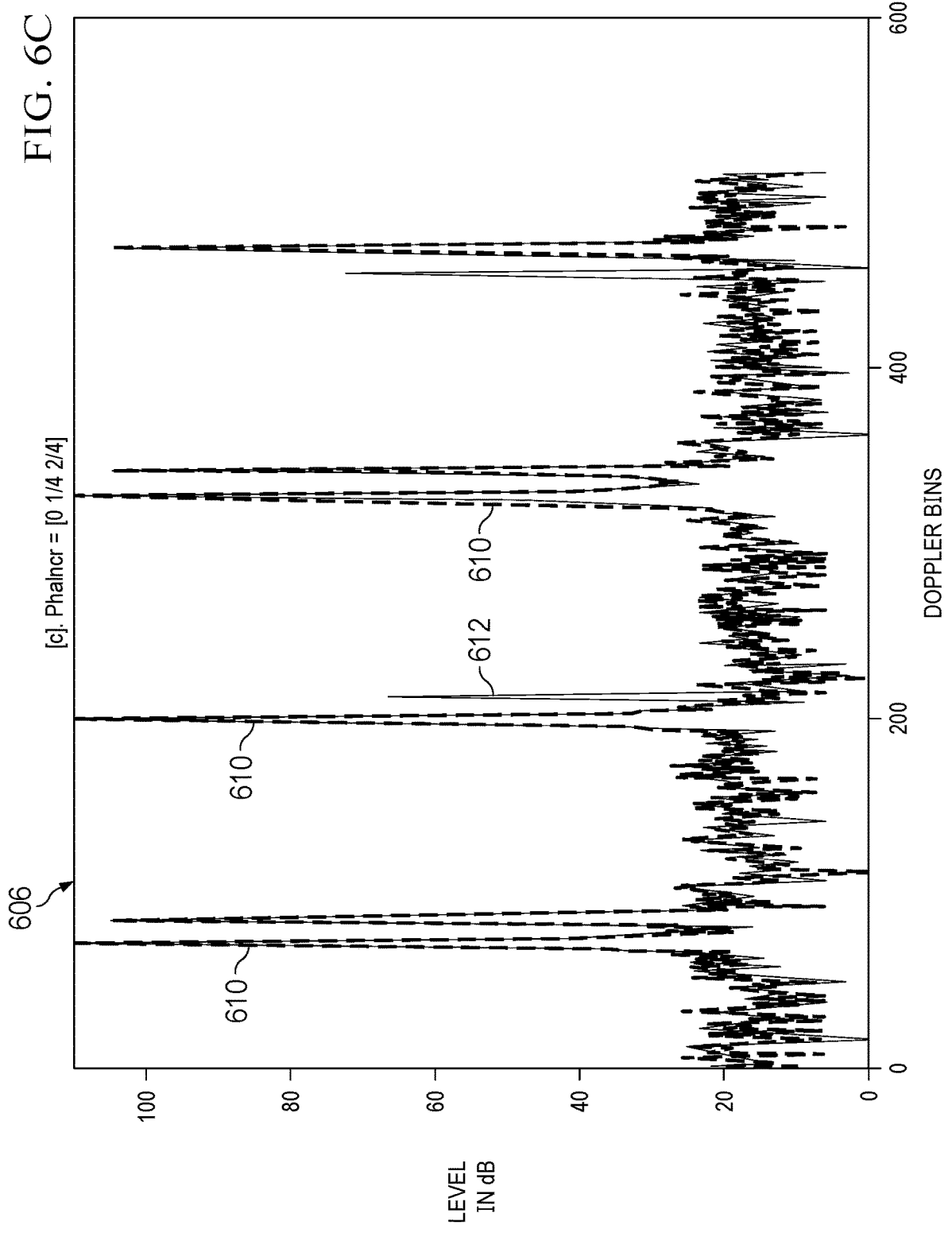
Figure 6D:
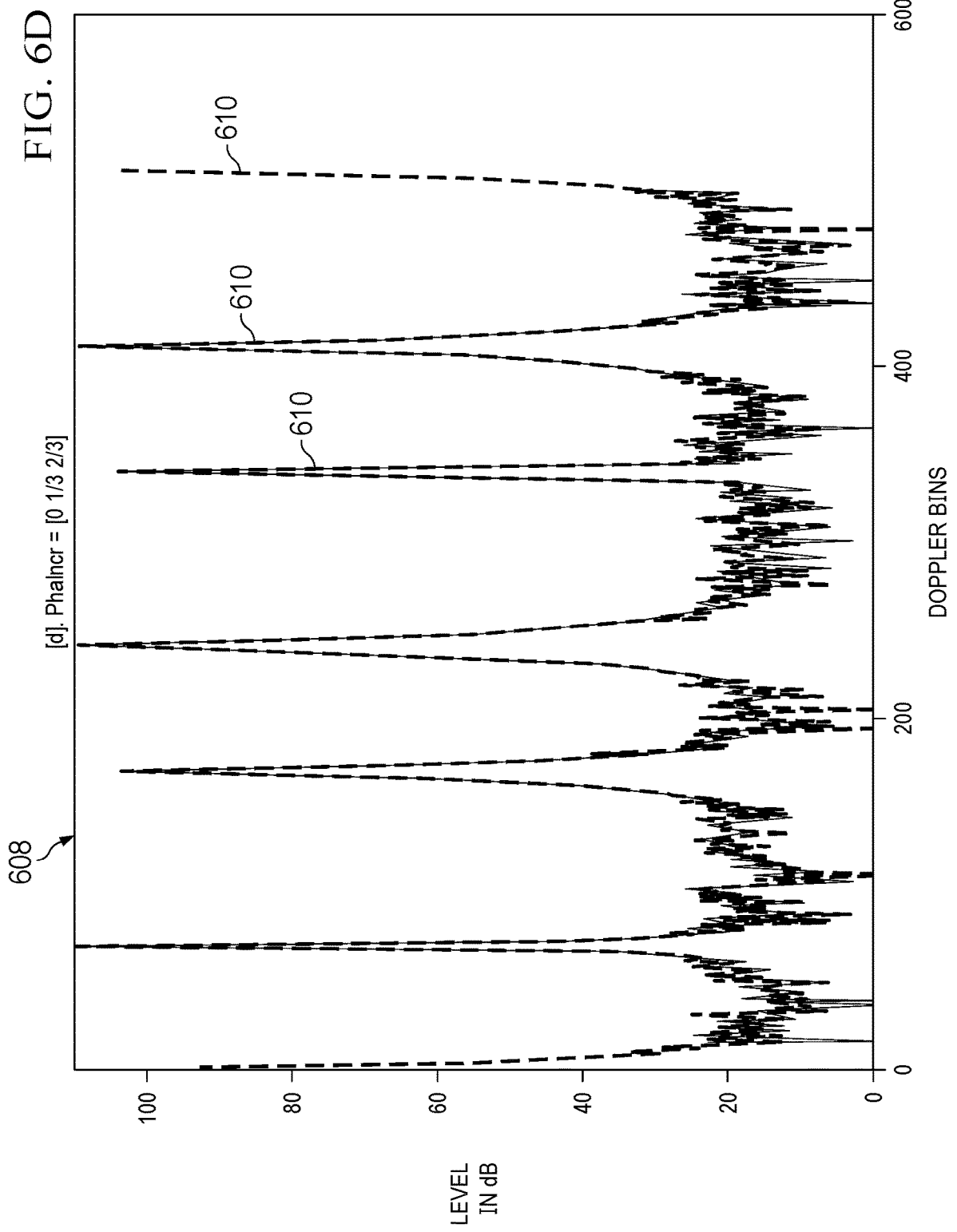

FIG. 6B shows a second graph 604 of Doppler shift versus amplitude of FFTs of second example received FMCW signals 100, received using the FMCW radar system 300 of FIG. 3. The second graph 604 corresponds to an FMCW signal 100 transmitted after being phase shifted using a base phase shift vector of [0 1/12 2/12]. FIG. 6C shows a third graph 606 of Doppler shift versus amplitude of FFTs of third example received FMCW signals 100, received using the FMCW radar system 300 of FIG. 3. The third graph 606 corresponds to an FMCW signal 100 transmitted after being phase shifted using a base phase shift vector of [0 1/4 2/4]. FIG. 6D shows a fourth graph 602 of Doppler shift versus amplitude of FFTs of fourth example received FMCW signals 100, received using the FMCW radar system 300 of FIG. 3. The fourth graph 608 corresponds to an FMCW signal 100 transmitted after being phase shifted using a base phase shift vector of [0 1/3 2/3].

Each of the first, second, third, and fourth graphs 602, 604, 606, and 608 corresponds to a single row (a single range bin, across the spectrum of Doppler bins) of a two dimensional FFT 420 of FIG. 4 or FIG. 5. Each of the first, second, third, and fourth graphs 602, 604, 606, and 608 includes amplitude spikes 610 that correctly correspond to the modulated Doppler frequency peaks determined by the velocity of an object in range 322 and by the base phase shift vector, and spurious amplitude spikes 612 that are artifacts resulting from phase shifter INL (see discussion with respect to FIG. 3).

The third and fourth graphs 606 and 608 have the fewest spurious amplitude spikes 612. However, in the fourth graph 608, the phase-shifter INL spurs 612 occlude the correct Doppler spikes 610. This increases the difficulty of (or prevents) demodulation, and of distinguishing which amplitude spikes 610 correspond to which of the first, second, or third transmitters 206a, 206b, or 206c (for example, distinguishing sister peaks from amplitude spikes 610 corresponding to objects in range 322). Base phase shift vectors for different numbers N of transmitters produce similar results: base phase shift vectors corresponding to $$\begin{bmatrix} 0 & \dfrac{1}{N+1} & \cdots & \dfrac{N-1}{N+1} \end{bmatrix}$$

reduce spurious amplitude spikes 612 while allowing signal demodulation and distinguishing of signal corresponding to different ones of the N transmitters. In some examples, using a base phase shift vector made up of base phase shifts that are 2π/(N+1) radians apart causes spurious amplitude spikes 612 to fall into a single bin of a Doppler FFT. Further, this single bin of a Doppler FFT is harmonically related to the corresponding correct Doppler spike(s) 610. This simplifies distinguishing correct amplitude spikes 610 from spurious amplitude spikes 612.

Figure 7:
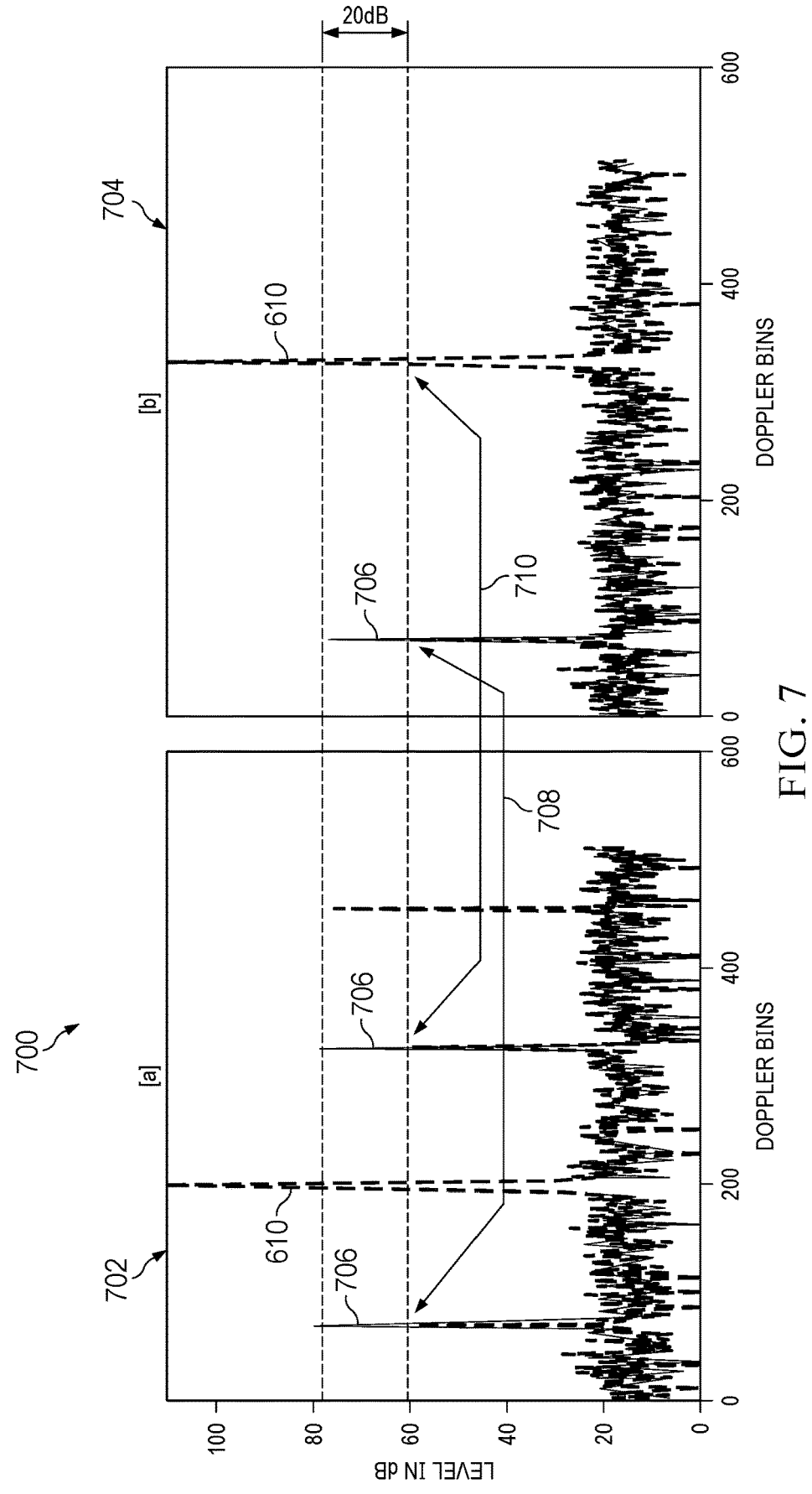
FIG. 7 shows graphs of Doppler shift versus amplitude of example received FMCW signals 100 transmitted by two different transmitters of the FMCW radar system of FIG. 3.

FIG. 7 shows graphs 700 of Doppler shift versus amplitude of example received FMCW signals 100 transmitted by two different transmitters of the FMCW radar system 300 of FIG. 3. A first graph 702 corresponds to an FFT of a received signal transmitted by the first transmitter 206a, and a second graph 704 corresponds to an FFT of a received signal transmitted by the second transmitter 206b. The first and second graphs 702 and 704 include spurious amplitude spikes at Doppler shifts that are harmonics 706 of the Doppler shifts of amplitude spikes 610 that correctly indicate velocity of an object in range 322. INL of phase shifters (in this example, the first and second phase shifters 204a and 204b) can cause harmonics 706 of amplitude spikes 610 corresponding to objects in range 322 to land in the same frequency bins in FFTs of received signals corresponding to different transmitters. This results in the harmonics 706 mutually reinforcing, as indicated by a first pair of arrows 708, increasing the chance of spurious detection of nonexistent objects. Also, harmonics 706 can land in the same frequency bins as amplitude spikes 610 that indicate objects in range 322, resulting in reinforcement of the amplitude spike 610, distorting the amplitude of the true peak; this case is indicated by a second pair of arrows 710.

Figure 8:
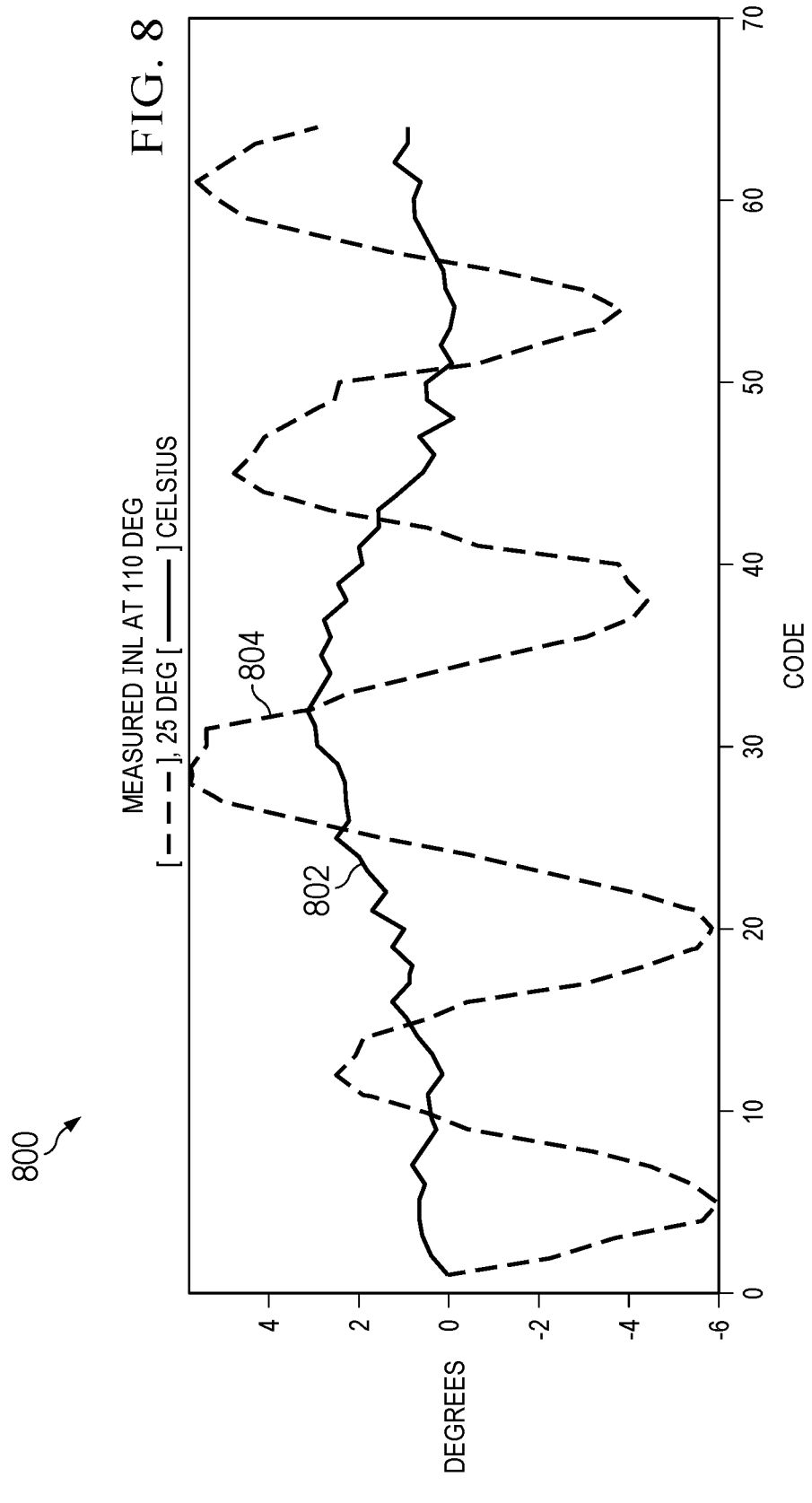
FIG. 8 shows an example graph relating phase shift input to phase shifter output error.

FIG. 8 shows an example graph 800 relating phase shift input to phase shifter output error. A horizontal axis shows phase shift input code, for a code ranging from 0 (zero degrees phase shift) to 63 (63/64×360° phase shift). A vertical axis shows INL of the phase shifter output corresponding to the input code, measured in degrees. A first INL line 802 shows INL corresponding to input code at a temperature of 25° C. A second INL line 804 shows INL corresponding to input code at a temperature of 110° C. The graph 800 shows that phase shifters output signals with different INLs at different phase shifts, and that temperature also affects INL. INL error is measured with an object at zero angle, at various temperatures, during phase shifter calibration at the factory.

For example, the first phase shifter 204a contributes a first amount of distortion by phase shifting an FMCW signal 100 using the phase shift vector, expressed in 0 to 63 code, [0 16 32 48]. The first phase shifter 204a contributes a second, different amount of distortion by phase shifting an FMCW signal 100 using the phase shift vector, expressed in 0 to 63 code, [4 20 36 52]. The two example phase shift vectors both use a base phase shift of 16. However, the second example phase shift vector adds a phase shift offset of four to each code in the phase shift vector.

Returning to FIG. 7, amplitudes of harmonics 706 can be mitigated by determining a constant phase shift offset to add to the outputs of the first, second, and third phase shifters 204a, 204b, and 204c that reduces a measure of total distortion contributed by respective INLs. Accordingly, using the INL profile of the FMCW radar system 300 (measured at the factory, as described above), phase shift codes reducing or minimizing INLs are selected. In some examples, different offsets are applied at different temperatures. Temperature-dependent offsets determined in the factory can be stored in the memory 320 and loaded according to temperatures sensed by the temperature sensor 319. In some examples, offsets are updated after a 50° C. temperature change.

Mean squared error and variance are example measures of total distortion contributed by phase shifter INLs. Mean squared error can be determined as shown in Equation 2, and variance can be determined as shown in Equation 3. In Equations 2 and 3, $code_i$ refers to an $i^{th}$ code in a phase shift vector that contains a number X codes, ideal output($code_i$) equals the ideal output of a phase shifter at code $code_i$, and actual output($code_i$) equals the actual output of the phase shifter at code $code_i$.

$$\text{Mean squared error} = \qquad \qquad \qquad \text{Equation 2}$$
$$\frac{1}{X}\sum\nolimits_{i=1}^{i=X}(\text{ideal output }(code_i) - \text{actual output }(code_i))^2$$

$$\text{Variance} = \qquad \qquad \qquad \text{Equation 3}$$
$$\frac{1}{X}\sum\nolimits_{i=1}^{i=X}((\text{ideal output }(code_i) - \text{actual output }(code_i)) -$$
$$\left. \frac{1}{X}\sum\nolimits_{i=1}^{i=X}(\text{ideal output }(code_i) - \text{actual output }(code_i)) \right)^2$$

In some examples, a phase shift offset to reduce or minimize INL at a given temperature for an FMCW radar system (such as the FMCW radar system 100) can be determined by finding a phase shift offset that reduces or minimizes INL for a phase shifter (such as the first, second, or third phase shifter 204a, 204b, or 204c) across the phase shifter's phase shift vector. If the transmitters (such as transmitters 206a, 206b, and 206c) of the FMCW radar system are fabricated on a single die, random error due to process variation is reduced, and error due to temperature variation may predominate. This enables INL for a given phase shift code for one of the transmitters to be treated as equal to INL for the given phase shift code for each of the other transmitters. Accordingly, determining the phase shift offset for a phase shifter with a phase shift vector (without offset) of the form [0 a/b 2a/b . . . (b−1)a/b] addresses each of the phase shifters, because all phase shifts in respective phase shift vectors are incorporated into the determination.

For example, in an FMCW radar system with four transmitters, determining the phase shift offset for the phase shifter with base phase shift of 1/5 and phase shift vector [0 1/5 2/5 3/5 4/5] also addresses a phase shifter with base phase shift of 2/5 and phase shift vector [0 2/5 4/5 1/5 3/5], and a phase shifter with base phase shift of 3/5 and phase shift vector [0 3/5 1/5 4/5 2/5]. In another example, in an FMCW radar system with three transmitters, determining the phase shift offset for the phase shifter with base phase shift of 1/4 and phase shift vector [0 1/4 1/2 3/4] also addresses a phase shifter with base phase shift of 1/2 and phase shift vector [0 1/2 0 1/2].

Phase shift offset can be determined by determining the mean squared error or variance for a phase shift vector, adding a phase shift offset of one to each code in the phase shift vector, repeating until all available phase shift offsets have been tested, and selecting the phase shift offset corresponding to the lowest resulting mean squared error or variance. For example, for a three transmitter FMCW radar system with 64 code phase shifters, the phase shift vector [0 16 32 48] is tested, then [1 17 33 49], then [2 18 34 50], and so forth. In this example, it may be sufficient to test through [15 31 47 63], because further phase shift code vectors are rotations of the original vector and other previously tested vectors.

Modifications are possible in the described embodiments, and other embodiments are possible, within the scope of the claims.

In some examples, an FMCW signal has idle times with different durations.

In some examples, an FMCW signal has different base frequencies during different idle times.

In some examples, different FMCW chirps have different maximum frequencies or different ramp times.

In some examples, same or equal means same or equal, respectively, within design and manufacturing tolerances.

In some examples, a function other than FFT is used for analysis of digital samples.

In some examples, such as in a multiple input multiple output radar, a waveform other than a sawtooth wave is used, such as a triangle wave, a sine wave, or a square wave.

What is claimed is:

1. A radar system, comprising:
a signal generator including an output, the signal generator configured to generate chirps;
N transmitters, each of the N transmitters including an input, wherein N is an integer of 2 or greater;
N phase shifters, each of the N phase shifters including an input and an output, the inputs of the N phase shifters coupled to the output of the signal generator, the outputs of the N phase shifters respectively coupled to the inputs of the N transmitters, each of the N phase shifters having a different base phase shift than the base phase shift of each of the other of the N phase shifters, the base phase shifts selected based on N, wherein the N phase shifters are configured to additionally phase shift the chirps by a same phase shift offset that is based on a performance characteristic of one or more of the N phase shifters;
multiple receivers, each of the multiple receivers including an output, one or more of the multiple receivers configured to receive a signal reflected by an object in range of the radar system; and
a processor configured to determine a location of the object in range in response to the received signal.

2. The radar system of claim 1, wherein a base phase shift vector of the N phase shifters is $$2\pi \times \left[ 0 \quad \frac{1}{N+1} \quad \cdots \quad \frac{N-1}{N+1} \right]$$

in radians.

3. The radar system of claim 1,
wherein the performance characteristic includes integral nonlinearities (INLs) of the one or more of the N phase shifters.

4. The radar system of claim 3,
wherein a particular one of the N phase shifters has a corresponding phase shift vector of the form [0 a/b 2a/b . . . (b−1)a/b], in which a and b are integers; and
wherein the phase shift offset is selected to reduce a measure of the INLs of the particular phase shifter in response to the corresponding phase shift vector.

5. The radar system of claim 3, wherein the phase shift offset is selected to reduce one or more of: a mean squared error of the INLs of a particular phase shifter, of the N phase shifter, with respect to ideal outputs of the particular phase shifter in response to the corresponding phase shift vector, or a variance of the INLs of the particular phase shifter with respect to ideal outputs of the particular phase shifter in response to the corresponding phase shift vector.

6. The radar system of claim 3, wherein the phase shift offset is selected to reduce one or more of: an inter-transmitter coupling level, or an amplitude of spurious amplitude spikes corresponding to harmonics of correct amplitude spikes in fast Fourier transforms (FFTs) of a signal received by the receivers, the correct amplitude spikes indicating one or more objects in range of the radar system.

7. The radar system of claim 3,
wherein the inputs of the N phase shifters are first inputs of the N phase shifters, each of the N phase shifters including a second input; and
further including a processor having an output coupled to the second inputs of the N phase shifters, the processor configured to control the N phase shifters to additionally phase shift the chirps by the phase shift offset.

8. The radar system of claim 7, further including:
a temperature sensor; and
a memory configured to store multiple phase shift offsets with corresponding temperature values;
wherein the processor is configured to control the N phase shifters to additionally phase shift the chirps by the phase shift offset in response to a temperature sensed by the temperature sensor, and a phase shift offset stored in the memory that corresponds to the sensed temperature.

9. The FMCW radar system of claim 1,
further including multiple mixers, each of the multiple mixers including a first input, a second input, and an output, the first inputs of the multiple mixers respectively coupled to the outputs of of the N receivers, the second inputs of the multiple mixers coupled to the output of the signal generator; and
wherein the processor is coupled to the outputs of the multiple mixers.

10. The FMCW radar system of claim 9, further including:
multiple filters respectively coupled to the multiple mixers; and
multiple analog to digital converters (ADCs) respectively coupled to the multiple filters, the ADCs having outputs coupled to the processor.

11. The FMCW radar system of claim 1, wherein each of the N phase shifters are configured to phase shift the FMCW chirps by the base phase shift of the phase shifter with respect to a sequentially-previous FMCW chirp phase shifted by the phase shifter.

12. The radar system of claim 1, wherein the radar system is a frequency modulated continuous wave radar system.

13. A radar system comprising:
a signal generator including an output, the signal generator configured to generate FMCW chirps;
N transmitters, ones of the transmitters including a respective input;
N phase shifters, each of the N phase shifters including an input and an output, the inputs of the N phase shifters coupled to the output of the signal generator, the outputs of the N phase shifters respectively coupled to the inputs of the N transmitters, each of the N phase shifters having a different base phase shift than the base phase shift of each of the other N phase shifters, the base phase shifts based on N, and wherein the base phase shifts are multiples of $$\frac{2\pi}{N+1}$$

in radians;

multiple receivers, each of the multiple receivers including an output, one or more of the receivers configured to receive a signal reflected by an object in range of the FMCW radar system; and
a processor configured to determine a location of the object in range in response to the received FMCW signal.

14. A method of operating a radar system that includes N transmitters, the method comprising:
generating N sets of chirps, wherein N is an integer of 2 or greater;
phase shifting the N sets of chirps using N phase shifters to produce N sets of phase shifted chirps, respectively, each of the N phase shifters having a different base phase shift than the base phase shift of each of the other of the N phase shifters, wherein one of: the base phase shifts are multiples of $$\frac{2\pi}{N+1}$$

in radians, and a base phase shift vector of the N phase shifters is $$2\pi \times \left[ 0 \quad \frac{1}{N+1} \quad \cdots \quad \frac{N-1}{N+1} \right]$$

in radians;
transmitting the N sets of phase shifted chirps using the N transmitters, respectively;
receiving a signal at multiple receivers; and
processing the received signal to determine information about at least one object in range of the FMCW radar system.

15. The method of claim 13, wherein the information about the at least one object includes presence and location of the at least one object in range of the radar system.

16. A method of operating a radar system that includes N transmitters, the method comprising:
generating sets of chirps;
phase shifting the N sets of chirps using N phase shifters to produce N sets of phase shifted chirps, respectively, each of the N phase shifters having a different base phase shift than the base phase shift of each of the other of the N phase shifters, the base phase shifts selected based on N; wherein the N phase shifters are configured to additionally phase shift respective sets of the N sets of chirps by a same phase shift offset that is selected in response to integral nonlinearities (INLs) of one or more of the N phase shifters;
transmitting the N sets of phase shifted chirps using the N transmitters, respectively;
receiving a signal at multiple receivers; and
processing the received signal to determine information about at least one object in range of the FMCW radar system.

17. The method of claim 16,
wherein a particular one of the N phase shifters has a corresponding phase shift vector of the form [0 a/b 2a/b . . . (b−1)a/b], in which a and b are integers; and
wherein the phase shift offset is selected to reduce a measure of the INLs of the particular phase shifter in response to the corresponding phase shift vector.

18. The method of claim 16, wherein the phase shift offset is selected to reduce one or more of: a mean squared error of the INLs of a particular phase shifter, of the N phase shifters, with respect to ideal outputs of the particular phase shifter in response to the corresponding phase shift vector, or a variance of the INLs of the particular phase shifter with respect to ideal outputs of the particular phase shifter in response to the corresponding phase shift vector.

19. The method of claim 16, wherein the phase shift offset is selected to reduce one or more of: an inter-transmitter coupling level, or an amplitude of spurious amplitude spikes corresponding to harmonics of correct amplitude spikes in fast Fourier transforms (FFTs) of a signal received by the receivers, the correct amplitude spikes indicating one or more objects in range of the radar system.

20. The method of claim 16, further including sensing a temperature;

wherein the phase shift offset is determined in response to the temperature.

* * * * *